(12) United States Patent
Jang

(10) Patent No.: US 12,254,190 B2
(45) Date of Patent: Mar. 18, 2025

(54) DATA STORAGE DEVICE AND METHOD OF OPERATING THE SAME

(71) Applicant: SK hynix Inc., Icheon-si (KR)

(72) Inventor: Eun Soo Jang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/330,985

(22) Filed: May 26, 2021

(65) Prior Publication Data
US 2022/0155976 A1     May 19, 2022

(30) Foreign Application Priority Data

Nov. 17, 2020    (KR) .......................... 10-2020-0154040

(51) Int. Cl.
     *G06F 3/06*        (2006.01)

(52) U.S. Cl.
     CPC ............ *G06F 3/0622* (2013.01); *G06F 3/064* (2013.01); *G06F 3/0656* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2009/0327716 A1* | 12/2009 | Raju | ...................... | H04L 9/3242 713/168 |
| 2011/0219150 A1* | 9/2011 | Piccirillo | ................. | G06F 21/85 710/24 |
| 2013/0047233 A1* | 2/2013 | Fisk | ....................... | G06F 21/606 709/219 |
| 2014/0205095 A1* | 7/2014 | Ittogi | ....................... | H04L 9/321 380/243 |
| 2019/0013081 A1* | 1/2019 | Blodgett | .................. | G06F 9/546 |
| 2019/0238312 A1* | 8/2019 | Dickens, III | .......... | H04L 9/0643 |
| 2019/0391761 A1* | 12/2019 | Brief | ...................... | G06F 3/0614 |
| 2020/0042241 A1* | 2/2020 | Nakano | ............... | G06F 11/0769 |
| 2020/0356280 A1* | 11/2020 | Sela | ......................... | G11C 11/409 |

FOREIGN PATENT DOCUMENTS

| | | |
|---|---|---|
| KR | 20190099693 A | 8/2019 |
| KR | 20200027982 A | 3/2020 |

\* cited by examiner

*Primary Examiner* — Yaima Rigol
*Assistant Examiner* — Alexander J Yoon
(74) *Attorney, Agent, or Firm* — Perkins Coie LLP

(57) ABSTRACT

The present technology relates to an electronic device. Based on the present technology, a storage device providing an improved security function may include a memory device including a protected memory block that is configured to store information for authenticating data to be read from or written to the memory device and is protected by a security protocol and a memory controller configured to receive a command protocol unit associated with the security protocol in a command including a host side protection message requesting data from a host be written in the protected memory block and perform a computation of a device message authentication code to be used in an authentication operation of the protected memory block, wherein the computation is performed concurrently with receiving a plurality of data units including the data from the host that is to be written in the protected memory block.

18 Claims, 19 Drawing Sheets

| Basic Header Segment (61) |||||
|---|---|---|---|---|
| Transaction Type || Flags | LUN | Task Tag |
| Initiator ID | Command Set Type | Query Function, Task Manag. Function | Response | Status |
| Total EHS Length || Device Information | Data Segment Length ||

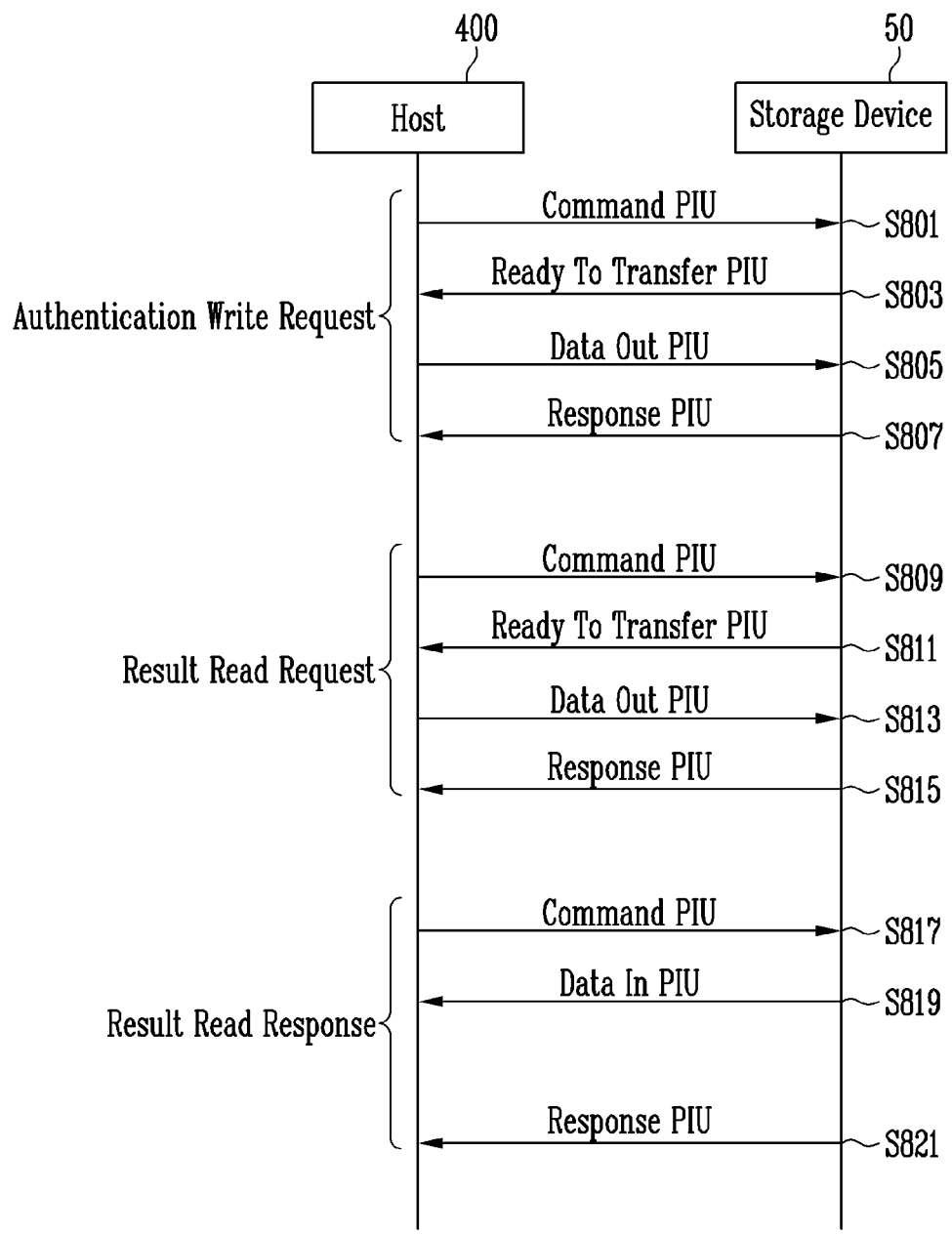

FIG. 9A

RPMB Message of Authentication Write Request

| Field Name | Value |
|---|---|
| Stuff Bytes | 0...00h |
| MAC / Key | MAC from the host |
| Data | Data |
| Nonce | 0...00h |
| Write Counter | Current Counter Value |
| Address | Address |
| Block Count | # of 256Bytes Blocks |
| Result | 0000h |
| Req./Resp. | 0003h |

FIG. 9B

RPMB Message of Result Read Request

| Field Name | Value |
|---|---|
| Stuff Bytes | 0...00h |
| MAC / Key | 0...00h |
| Data | 0...00h |
| Nonce | 0...00h |
| Write Counter | 0...00h |
| Address | 0000h |
| Block Count | 0000h |
| Result | 0000h |
| Req./Resp. | 0005h |

FIG. 9C
RPMB Message of Result Read Response

| Field Name | Value |
|---|---|
| Stuff Bytes | 0...00h |
| MAC / Key | MAC from the storage device |
| Data | 0...00h |
| Nonce | 0...00h |
| Write Counter | New Counter Value |
| Address | Address |
| Block Count | 0000h |
| Result | Result Code |
| Req./Resp. | 0300h |

FIG. 12

| Response PIU | | | | |
|---|---|---|---|---|
| Basic Header Segment | 0 Transaction Type | 1 Flags | 2 LUN | 3 Task Tag |
| | 4 Initiator ID / Command Set Type | 5 Reserved | 6 Reserved | 7 Reserved |
| | 8 Total EHS Length =non-zero | 9 Reserved | 10 (MSB) Data Segment Length | 11 (LSB) |
| Transaction Specific Fields | 12 (MSB) Residual Transfer Count | 13 | 14 | 15 (LSB) |
| | 16 Reserved | 17 | 18 | 19 |
| | 20 Reserved | 21 | 22 | 23 |
| | 24 Reserved | 25 | 26 | 27 |
| | 28 Reserved | 29 | 30 | 31 |
| Extra Header Segment | k Extra Header Segment (EHS) 1 | k+1 | k+2 | k+3 |
| | ⋮ | | | |
| | j Extra Header Segment (EHS) N | j+1 | j+2 | j+3 |
| | Header E2ECRC (omit if HD=0) | | | |
| Data Segment | k (MSB) Sense Data Length | k+1 (LSB) | k+2 Sense Data[0] | k+3 Sense Data[1] |
| | ⋮ | ⋮ | ⋮ | ⋮ |
| | k+16 Sense Data[14] | k+17 Sense Data[15] | k+18 Sense Data[16] | k+19 Sense Data[17] |
| | Data E2ECRC (omit if DD=0) | | | |

DATA STORAGE DEVICE AND METHOD OF OPERATING THE SAME

CROSS-REFERENCE TO RELATED APPLICATION

This patent document claims the priority and benefits of the Korean patent application number 10-2020-0154040, filed on Nov. 17, 2020, which is incorporated herein by reference in its entirety.

TECHNICAL FIELD

The disclosed technology relates to an electronic device, and more particularly, to a storage device and a method of operating the same.

BACKGROUND

A data storage device is a device that is used to store or provide data in response to the requests from a host device such as a computer or a smartphone. Such a data storage device may include one or more memory devices for storing data and a memory controller for controlling the one or more memory devices. The memory device may be classified into a volatile memory device and a nonvolatile memory device.

The volatile memory device only retains its data while the device is powered and loses its data when power is lost. The volatile memory device may include, for example, a static random access memory (SRAM) and a dynamic random access memory (DRAM).

The nonvolatile memory device retains stored data even in the absence of power supply and thus does not lose its data when power is lost. The nonvolatile memory device includes, for example, a read only memory (ROM), a programmable ROM (PROM), an electrically programmable ROM (EPROM), an electrically erasable and programmable ROM (EEPROM), and a flash memory.

SUMMARY

The embodiments of the disclosed technology relate to devices and methods that can improve security on data storage devices and a method of operating the same.

A storage device based on an embodiment of the disclosed technology includes a memory device that includes a protected memory block that is configured to store information for authenticating data to be read from or written to the memory device and is protected by a security protocol and a memory controller coupled to the memory device to control operations thereof and configured to: receive a command protocol unit associated with the security protocol in a command including a host side protection message requesting data from a host be written in the protected memory block; and perform a computation of a device message authentication code to be used in an authentication operation of the protected memory block, wherein the computation is performed concurrently with receiving a plurality of data units including the data from the host that is to be written in the protected memory block.

In some implementations of the disclosed technology, a storage device includes a nonvolatile memory device that includes a replay protection block, and a memory controller configured to receive a command protocol unit including a host replay protection block message requesting to store write data in the replay protection block from an external host, and calculate a device message authentication code to be used in an authentication operation on the replay protection block while receiving a plurality of data out protocol units including the write data from the external host, after receiving the command protocol unit.

In some implementations of the disclosed technology, a data storage device providing an improved security function and a method of operating the same are provided.

BRIEF DESCRIPTION OF THE DRAWINGS

FIG. 8 is a diagram illustrating an example of a replay protection block write operation.

FIGS. 9A to 9C are diagrams illustrating an example of a replay protection block message provided during the replay protection block write operation of FIG. 8 based on some embodiments of the disclosed technology.

FIG. 12 is a diagram illustrating an example of a response PIU of FIG. 10 based on some embodiments of the disclosed technology.

DETAILED DESCRIPTION

The technology disclosed in this patent document can be implemented in some embodiments to provide data storage devices and data storage methods that, among other features and benefits, can provide improved security by using security protocols such as replay protected memory block features.

Figure 1:
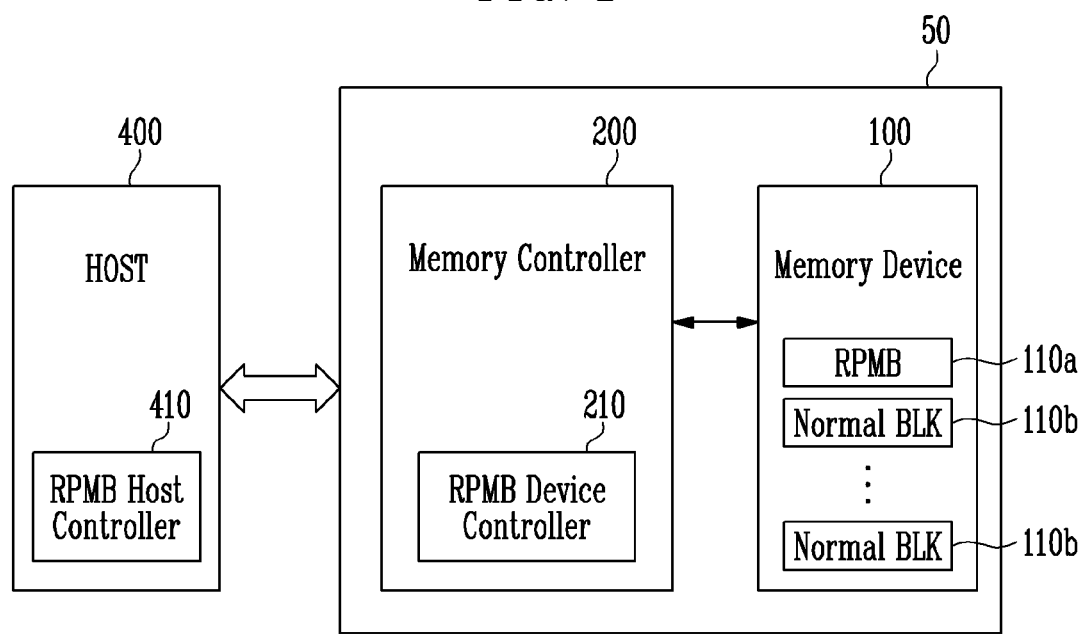
FIG. 1 is a diagram illustrating an example of a data storage device based on an embodiment of the disclosed technology.

FIG. 1 is a diagram illustrating an example of a data storage device based on an embodiment of the disclosed technology.

Referring to FIG. 1, a storage device 50 may include a memory device 100 and a memory controller 200. In this patent document, the term "storage device" is used to indicate a data storage device. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of the host 400 that stores high-capacity data in one place, such as a server or a data center.

The storage device 50 may be manufactured as one of various types of storage devices based on a host interface that is a communication method with the host 400. For example, the storage device 50 may be configured as any one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

The memory blocks included in the memory device 100 may include a protected memory block such as a replay protection block or replay protected memory block (RPMB) 110a and a normal block (Normal BLK) 110b.

The protected memory block is configured to store information for authenticating data to be read from or written to the memory device and is protected by a security protocol. The replay protection block RPMB 110a is one example of such a protected memory block that is accessible only through a security protocol such as using a predetermined special command or authentication. A write count for the replay protection block 110a may be limited to a predetermined number by the host 400. When a write operation corresponding to a maximum write counter value for the replay protection block 110a is performed, only a read operation on the replay protection block 110a may be allowed.

In some implementations, the replay protection block or RPMB may include a secure memory block for storing small amounts of sensitive information. In one example, the replay protection block or RPMB may be configured to enable a device to store data in a small, specific area that is authenticated and protected against a replay attack which occurs when a piece of malware running a replay attack intercepts an initial message between the right entities, by resending or replaying that same message in a later stage. In order to protect sensitive information from such a replay attack, the RPMB authentication key information is first written by the host to the secure memory block, and then used by both host and the memory device to authenticate read and write messages involving the RPMB area.

A size of write data for the protected memory block such as the replay protection block 110a (e.g., data written to the protected memory block) may be determined in advance. For example, data stored in the replay protection block 110a may have a unit of 128 Kbytes. In an embodiment, the data stored in the replay protection block 110a may have a maximum data size of 16 Mbytes.

Access to the replay protection block 110a may be allowed only when the authentication is successful. The authentication for the replay protection block 110a may be accomplished by storing, by each of the host 400 and the storage device 50, the same authentication key only once for the first time, and determining whether message authentication codes (MACs) generated by each of the host 400 and the storage device 50 using data to be stored match the authentication key. In some implementations, the message authentication code includes a piece of information that is used to confirm a message came from the stated sender and has not been changed. In some implementations, the MAC may be generated by each of the host 400 and the storage device 50 using a hash-based MAC such as HMAC secure hash algorithm (SHA)-256. In the replay protection block 110a, data stored in the replay protection block 110a may be maintained while a value of the authentication key and a write counter are maintained.

In FIG. 1, the memory device 100 includes one replay protection block 110a, but the memory device 100 may include two or more replay protection blocks 110a. In this case, each replay protection block 110a may have unique authentication key and write count value.

The normal block may be a memory block that may be accessed without requiring separate authentication. The normal block may be a memory block that stores data other than the data stored in the replay protection block 110a.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command and an address from the memory controller 200 and access an area selected by an address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

Upon power-up of the storage device 50, the memory controller 200 may execute firmware (FW) operations. When the memory device 100 is a flash memory device, the memory controller 200 may execute firmware such as a flash translation layer (FTL) for controlling communication between the host 400 and the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored.

The memory controller 200 may control the memory device 100 to perform the program operation, the read operation, or the erase operation based on a request of the host 400. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data on independently regardless of the request from the host 400 and transmit the command, the address, and the data to the memory device 100. For example, the memory controller 200 may provide the command, the address, and the data for performing a program operation, a read operation, and an erase operation accompanying in performing wear leveling, read reclaim, garbage collection, and the like, to the memory device 100.

In an embodiment, the memory controller 200 may control at least two or more memory devices 100. In this case, the memory controller 200 may control the memory devices 100 based on an interleaving method to improve operation performance. The interleaving method may be a method of controlling operations for at least two memory devices 100 to overlap with each other.

The memory controller 200 may include a replay protection block device controller 210.

The replay protection block device controller 210 may process an access request for the replay protection block 110a.

The replay protection block device controller 210 may process a replay protection block write operation of storing data in the replay protection block 110a and a replay protection block read operation of reading the data stored in the replay protection block 110a. A specific method in which the replay protection block device controller 210 processes the replay protection block write operation and the replay protection block read operation is described in more detail with reference to FIGS. 4 to 19 to be described later.

The host 400 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

The host 400 may further include a replay protection block host controller 410.

The replay protection block host controller 410 may generate various requests or commands for controlling the replay protection block 110a and provide the various requests or commands to the replay protection block device controller 210. The replay protection block host controller 410 may receive a response or a process result from the replay protection block device controller 210.

Figure 2:
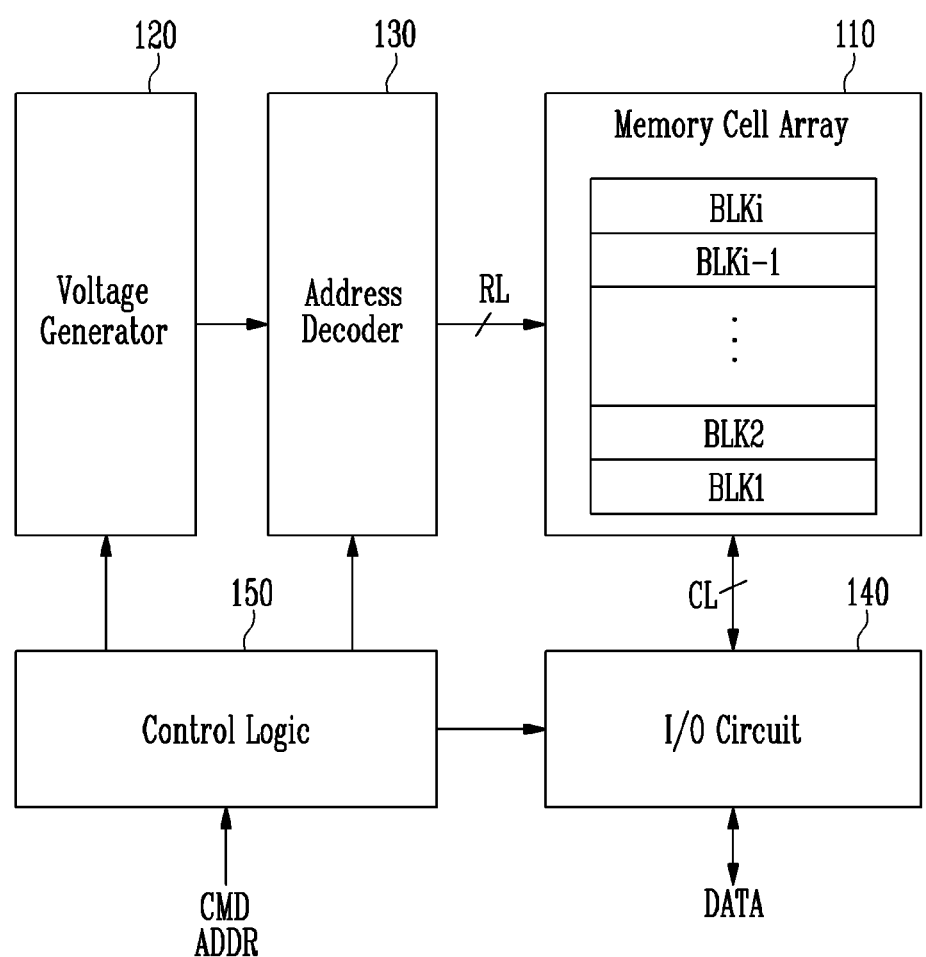
FIG. 2 is a diagram illustrating an example of a memory device of FIG. 1.

FIG. 2 is a diagram illustrating an example of the memory device of FIG. 1.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

The plurality of memory blocks BLK1 to BLKi may include the replay protection block 110a and the normal block 110b as illustrated in FIG. 1.

In an embodiment, the voltage generator 120, the address decoder 130, and the input/output circuit 140 may be collectively referred to as a peripheral circuit. The peripheral circuit may be used to operate the memory cell array 110 under control of the control logic 150. The peripheral circuit may be used to perform the program operation, the read operation, and the erase operation on the memory cell array 110.

The voltage generator 120 is configured to generate a plurality of operation voltages using an external power voltage supplied to the memory device 100. The voltage generator 120 operates in response to the control of the control logic 150.

In some implementations, the voltage generator 120 may generate an internal power voltage by regulating the external power voltage. The internal power voltage generated by the voltage generator 120 is used as an operation voltage of the memory device 100.

In some implementations, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi based on the decoded block address. The address decoder 130 may decode a row address among the received addresses ADDR. The address decoder 130 may select at least one word line among word lines of a selected memory block based on the decoded row address. In an embodiment, the address decoder 130 may decode a column address among the received addresses ADDR. The address decoder 130 may connect the input/output circuit 140 and the memory cell array 110 to each other based on the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells based on data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
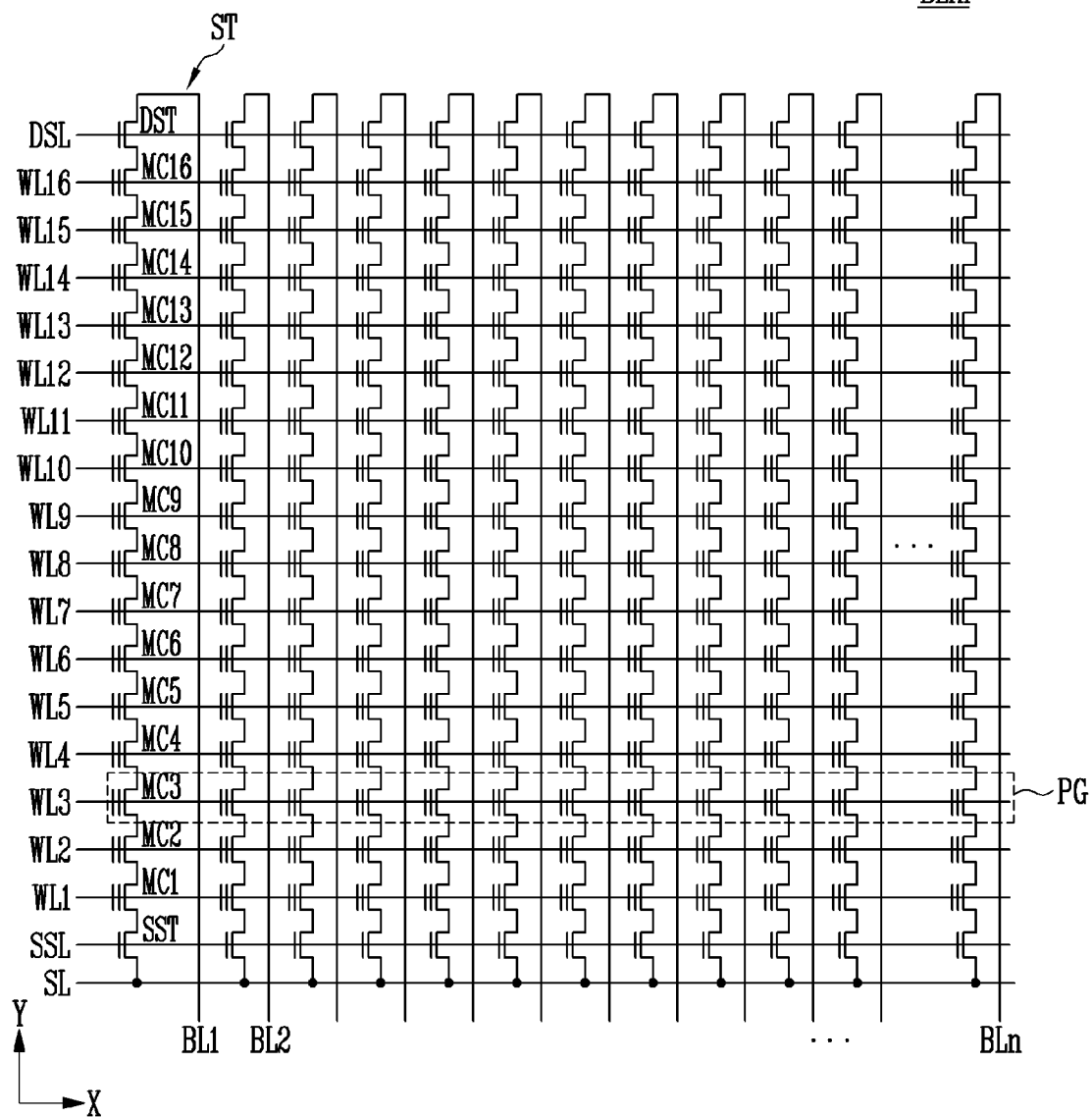
FIG. 3 is a diagram illustrating an example configuration of a memory block of FIG. 2.

FIG. 3 is a diagram illustrating an example configuration of a memory block of FIG. 2.

The memory block BLKi is any one of the memory blocks BLK1 to BLKi of FIG. 2.

Referring to FIG. 3, a plurality of word lines arranged in parallel with each other may be connected between a first select line and a second select line. Here, the first select line may be the source select line SSL, and the second select line may be the drain select line DSL. More specifically, the memory block BLKi may include a plurality of strings (memory cell strings) ST connected between the bit lines BL1 to BLn and the source line SL. The bit lines BL1 to BLn may be connected to the strings ST, respectively, and the source line SL may be connected to the strings ST in common. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include the memory cells MC1 to MC16 more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include the pages PG of the number of the word lines WL1 to WL16.

In some implementations, each memory cell may be used as a single level cell (SLC) to store one bit of data. In this case, one physical page PG may store one logical page (LPG) data. The one logical page (LPG) data may include data bits of the same number as cells included in one physical page PG.

In some implementations, each memory cell may store two or more bits of data. In this case, one physical page PG may store two or more logical page (LPG) data.

Figure 4:
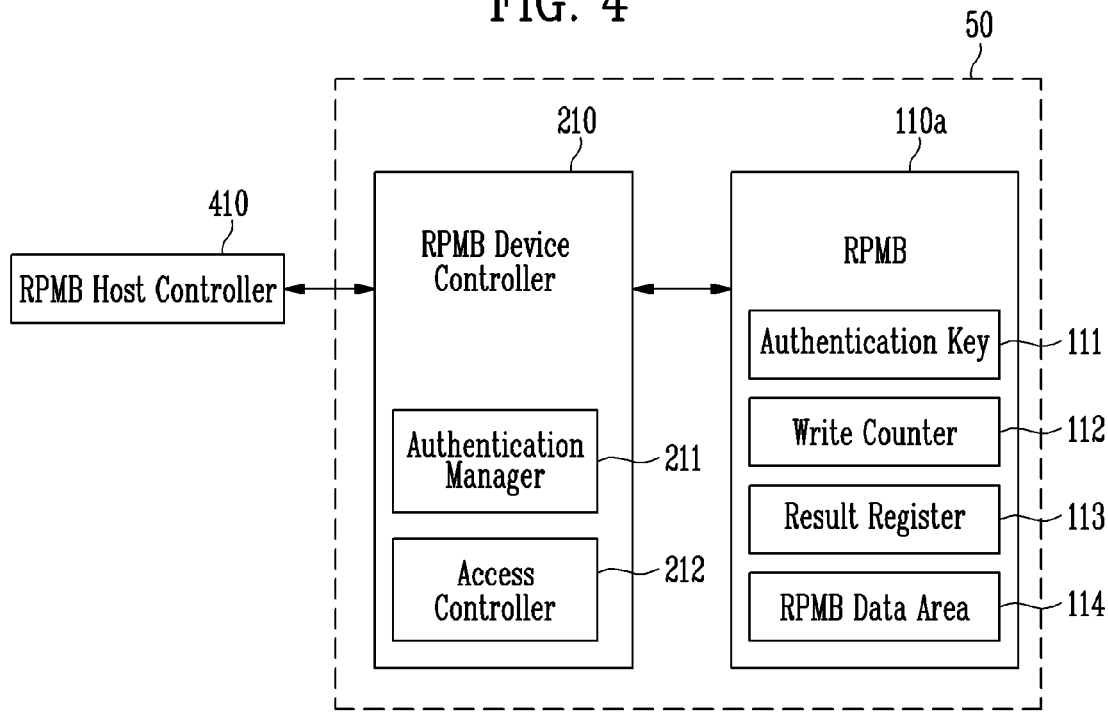
FIG. 4 is a diagram illustrating an access operation on a replay protection block.

FIG. 4 is a diagram illustrating an access operation on a replay protection block.

Referring to FIG. 4, the storage device 50 may include the replay protection block 110*a* and the replay protection block device controller 210 that controls the replay protection block 110*a*. The replay protection block 110*a* may be one of the memory blocks included in the memory device 100 illustrated in FIG. 1, and the replay protection block device controller 210 may be included in the memory controller 200.

The replay protection block 110*a* may include an authentication key 111, a write counter 112, a result register 113, and a replay protection block data area (RPMB Data Area) 114.

In some implementations, the authentication key 111 may include a memory space for an authentication key. In some implementations, the authentication key 111 may be stored only once, may not be read, and may be accessed only when calculating the MAC for authentication. In an embodiment, the authentication key 111 may have a size of 32 bytes.

The write counter 112 may count the number of the successful replay protection block write operations. The write counter 112 may store a write count value corresponding to 4 bytes. A value of an initial write counter 112 may be "0000 0000h". The write count value of the write counter 112 may not be reset or decreased. The value of the write counter 112 may no longer increase after reaching "FFFF FFFFh" which is a maximum value. Therefore, when the value of the write counter 112 reaches the maximum value, data may no longer be stored in the replay protection block 110a, and the replay protection block 110a may operate as a read-only block.

The result register 113 may store a result of the replay protection block write operation or the replay protection block read operation.

In an embodiment, the authentication key 111, the write counter 112, and the result register 113 may be independently included for each replay protection block 110a, and may have a unique value.

The replay protection block data area 114 may include an area that is configured to store data only when the authentication is successful.

When the replay protection block write operation is performed, the replay protection block host controller 410 may provide a replay protection block message to the replay protection block device controller 210 according to a predetermined format. The replay protection block message provided by the replay protection block host controller 410 may include information required to perform the authentication operation on the replay protection block. For example, the replay protection block message may include authentication data and metadata. The authentication data may include the MAC generated by the replay protection block host controller 410.

The replay protection block device controller 210 may further include an authentication manager 211 and an access controller 212.

The authentication manager 211 may perform an authentication operation using the authentication data and the metadata included in the replay protection block message and the authentication key 111 stored in the replay protection block 110a. The authentication manager 211 may provide a result of performing the authentication operation to the access controller 212. The access controller 212 may store data in the replay protection block 110a or prohibit storage of data in the replay protection block 110a according to the result of performing the authentication operation.

When the authentication operation is successful, the access controller 212 may control the replay protection block 110a to store write data to be stored in the replay protection block, in the replay protection block data area 114. The access controller 212 may increase the value of the write counter 112 and store information indicating that the replay protection block write operation is completed in the result register 113.

When the authentication operation is failed, the access controller 212 may not store the write data requested to be stored in the replay protection block, in the replay protection block data area 114. The access controller 212 may maintain the value of the write counter 112 and store information indicating that the replay protection block write operation is completed in the result register 113.

When the replay protection block read operation is performed, the replay protection block host controller 410 may provide a replay protection block message to the replay protection block device controller 210 based on a predetermined format. The replay protection block message provided by the replay protection block host controller 410 may include information required to perform the authentication operation on the replay protection block. For example, the replay protection block message may include metadata.

The access controller 212 may read the data stored in the replay protection block and generate the replay protection block message to be provided to the replay protection block host controller 410. The access controller 212 may obtain some (for example, nonce) of the metadata included in the replay protection block message received from the replay protection block host controller 410, and generate metadata including some of the metadata included in the replay protection block message received from the replay protection block host controller 410 and a result of the replay protection block read operation. The access controller 212 may generate authentication data using the generated metadata and the authentication key 111 stored in the replay protection block 110a. The authentication data may include the MAC used for the authentication operation performed by the replay protection block host controller 410 to access the read data later.

The access controller 212 may generate the replay protection block message including the generated metadata and the authentication data, and provide the read data and the replay protection block message to the replay protection block host controller 410. In an embodiment, the replay protection block message provided by the access controller 212 may include result information stored in the result register 113.

Figure 5:
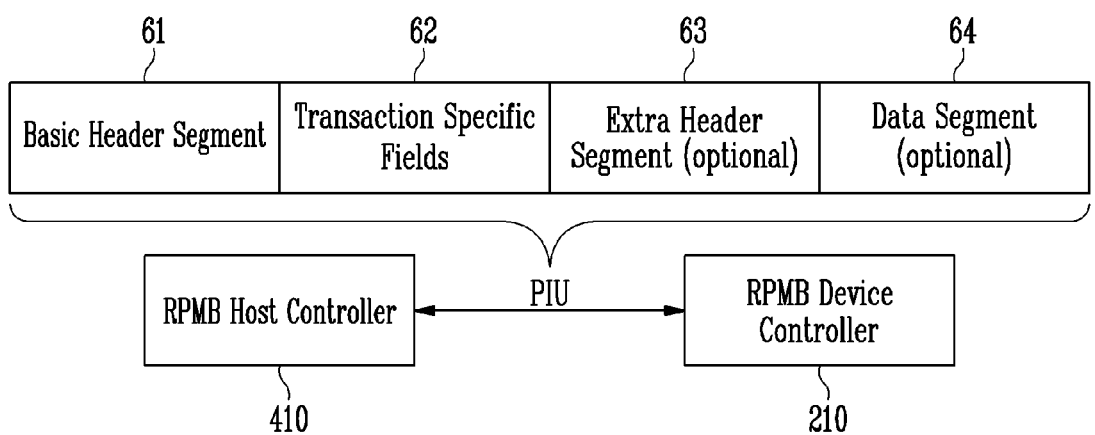
FIG. 5 is a diagram illustrating a data structure of data that is transmitted between a replay protection block host controller and a replay protection block device controller.

FIG. 5 is a diagram illustrating a data structure of data that is transmitted between a replay protection block host controller and a replay protection block device controller.

Referring to FIGS. 4 and 5, the replay protection block host controller 410 and the replay protection block device controller 210 may communicate using data packets. The data packet or message through which information such as security information can be transferred between a host (e.g., UFS host) and a data storage device can be referred to as a protocol unit or protocol information unit (PIU). The protocol component (or PIU) may have a predefined data structure that includes a number of sequentially addressed bytes arranged as various fields, as will be discussed below.

The PIU may include a command PIU, a response PIU, a data out PIU, a data in PIU, and a "ready to transfer" PIU based on an operation to be performed by the replay protection block host controller 410 or the replay protection block device controller 210.

The command PIU may be a PIU transmitted when the host 400 transfers a command to the storage device 50.

The response PIU may be a PIU transferred when the storage device 50 provides a response to the command provided by the host 400.

The data out PIU may be a PIU transmitted when the host 400 provides data to the storage device 50.

The data in PIU may be a PIU transmitted when the storage device 50 provides data to the host 400.

The "ready to transfer" PIU may be transmitted to inform that the storage device 50 is ready to receive the data out PIU from the host 400. The ready to transfer PIU may be transmitted when the storage device 50 has a sufficient buffer space to store data provided by the host 400.

In some implementations, the size of the smallest PIU may be 32 bytes, and the maximum size of the PIU may be 65600 bytes. A format of the PIU may have different sizes depending on its type.

The PIU may include a basic header segment 61, a transaction specific field 62, an additional header segment 63, and a data segment 64.

The basic header segment 61 may have a size of 12 bytes. The basic header segment 61 may be included in all PIUs.

The transaction specific field 62 may be included in a byte address 12 to a byte address 31 of the PIU. The transaction specific field 62 may include a dedicated transaction code based on the type of the PIU.

The additional header segment 63 may be defined when a total additional header length (Total EHS Length) field of the basic header segment 61 has a value other than 0. The additional header segment 63 may start from a byte address 32 of the PIU. The additional header segment 63 may be an area capable of additionally storing data when sufficient information may not be included in the basic header segment 61.

The data segment 64 may be included in the data out PIU or the data in PIU, and may not be included in other PIUs.

In an embodiment, the additional header segment 63 and the data segment 64 may not be included in all protocol PIUs, but may be included only in a specific PIU.

Figures 6, 7:
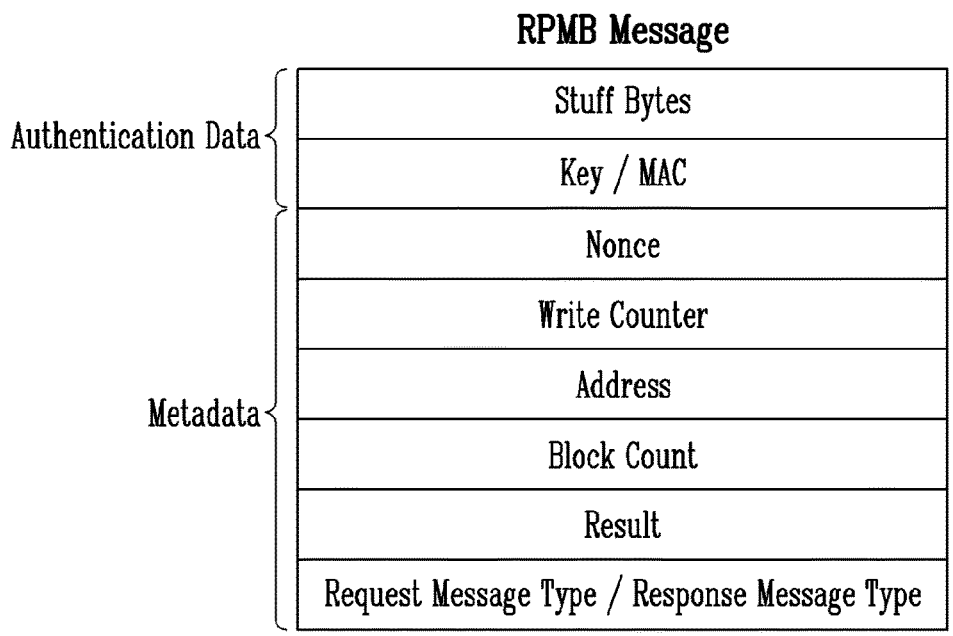
FIG. 6 is a diagram illustrating a structure of a basic header segment of a protocol unit or protocol information unit (PIU).
FIG. 7 is a diagram illustrating an example of a structure of a replay protection block message that is used when a replay protection block write operation or a replay protection block read operation is performed.

FIG. 6 is a diagram illustrating a structure of a basic header segment of a PIU.

Referring to FIG. 6, the basic header segment 61 may include a transaction type, flags, a logical unit number (LUN), a task tag, an initiator ID, a command set type, a query function/task management function (Query Function, Task Manag. Function), a response, a status, a total additional header segment length (Total EHS Length), device information, and a data segment length.

The transaction type may have a unique value based on the type of the PIU. An example of the transaction type based on the type of the PIU is shown in [Table 1] below.

TABLE 1

| When host provides to storage device | Transaction type | When storage device provides to host | Transaction type |
|---|---|---|---|
| Command PIU | 00 0001b | Response PIU | 10 0001b |
| Data out PIU | 00 0010b | Data in PIU | 10 0010b |
| X | X | Ready to transfer PIU | 11 0001b |

The flags may be fields having different values based on the transaction type.

The logical unit number (LUN) may be a field indicating a number of a logical unit to perform a corresponding operation among a plurality of logical units included in an object on which an operation is to be performed.

The task tag may be a field having different values based on the transaction type.

The initiator ID may be a field identifying who is an initiator requesting an operation. Therefore, the initiator ID may have different values in a case where the host generates the PIU and the storage device generates the PIU.

The command set type may be a field included in the command PIU and the response PIU. The command set type may be a field indicating which interface a command supports, such as whether the command is an SCSI command, a UFS command, or a command defined by a manufacturer.

The query function/task management function (Query Function, Task Manag. Function) may be a field input to the PIU such as a query request, a query response, or a task management request.

The response may be a field indicating whether performance of the requested operation is successful or failed.

The status may be a field indicating an SCSI status.

The total additional header segment length (Total EHS Length) may be a field indicating a size of the additional header segment in 32 bit unit. The total additional header segment length (Total EHS Length) may be used when the PIU includes an additional header segment. The length of the additional header segment may be in 4 byte unit. A value of the total additional header segment length (Total EHS Length) may be a value obtained by dividing the total number of bytes of the additional header segment by 4. A maximum size of the additional header segment may be 1024 bytes. When the additional header segment is not used, the total additional header segment length (Total EHS Length) may be 0.

The device information may include information used only when performing a specific function.

The data segment length may be a field indicating a length of a data segment of the PIU. When the PIU does not include the data segment, the data segment length may be 0.

FIG. 7 is a diagram illustrating an example of a structure of a replay protection block message that is used when a replay protection block write operation or a replay protection block read operation is performed.

Referring to FIGS. 4 and 7, a replay protection block message (RPMB message) may be a message provided when an operation on the replay protection block is performed.

The replay protection block message (RPMB Message) may include the authentication data and the metadata.

The authentication data may include stuff bytes and the MAC. The MAC may be a result calculated by the replay protection block host controller 410 using the authentication key stored in advance and the metadata. That is, the MAC may be an authentication code calculated using the hash-based MAC (HMAC SHA-256). The MAC may have a length of 256 bits (32 bytes). The authentication key used to generate the MAC may be 256 bits.

The metadata may include a nonce, a write counter, an address, a block count, a result, and a request message type/response message type.

The nonce may be a random number generated by the replay protection block host controller 410. The nonce provided by the replay protection block host controller 410 may be copied to a response provided from the replay protection block device controller 210 to the replay protection block host controller 410.

The write counter may be the number of successful write operations that are performed for the replay protection block 110a.

The address may be a logical address where data is to be stored in the replay protection block 110a or a logical address where data is to be read from the replay protection block 110a.

The block count may be the number of logical blocks for which the replay protection block write operation or the replay protection block read operation is requested. The block count may be the number of logical blocks in 256 byte unit.

The result may be a result of performing the replay protection block write operation or the replay protection block read operation.

The request message type/response message type may indicate whether the replay protection block message is a message related to the replay protection block write operation or the replay protection block read operation.

FIG. 8 is a diagram illustrating an example of a replay protection block write operation Referring to FIG. 8, the replay protection block write operation of storing data in the replay protection block involves a combination (protocol handshake) of three commands between the host 400 and the storage device 50.

Specifically, the replay protection block write operation includes an authentication write request, a result read request, and a result read response.

The authentication write request may be executed by performing a plurality of operations S801 to S807, the result read request may be executed by performing a plurality of operations steps S809 to S815, and the result read response may be carried out by performing a plurality of operations steps S817 to S821.

The authentication write request may be a request including storage of data in the replay protection block and the data to be stored.

The result read request may be a request for transferring a command for requesting a value stored in the result register in which a result of performing the replay protection block write operation is stored.

The result read response may be a response providing a value of the result register.

At S801, the host 400 may provide the command PIU to the storage device 50. The command PIU provided at S801 may include the replay protection block message. The storage device 50 may perform an authentication operation on the replay protection block using the MAC and the metadata included in the replay protection block message.

At S803, the storage device 50 may provide the ready to transfer PIU to the host 400. The ready to transfer PIU may be a PIU provided when the storage device 50 is ready to receive data to be provided by the host 400. In an embodiment, the ready to transfer PIU may be a PIU that provides a message indicating that it is ready to receive the data out PIU.

At S805, the host 400 may provide the data out PIU to the storage device 50. The data out PIU provided by the host 400 may include a plurality of data segments including the data to be stored in the replay protection block.

In an embodiment, the operations S803 and S805 may be repeated several times based on an amount of data that is to be stored in the replay protection block by the host 400.

At S807, the storage device 50 may provide the response PIU to the host 400. The response PIU provided by the storage device 50 may include the result of performing the replay protection block write operation.

At S809, the host 400 may provide the command PIU to the storage device 50. The command PIU provided at S809 may include the replay protection block message. In an embodiment, the replay protection block message included in the command PIU provided at S809 may include a message that the command PIU provided by the host 400 requests the value stored in the result register.

At S811, the storage device 50 may provide the ready to transfer PIU to the host 400. The ready to transfer PIU may be a PIU provided when the storage device 50 is ready to receive data to be provided by the host 400. In an embodiment, the ready to transfer PIU may be a PIU that provides a message indicating that it is ready to receive the data out PIU.

At S813, the host 400 may provide the data out PIU to the storage device 50.

At S815, the storage device 50 may provide the response PIU to the host 400. At S815, the response PIU provided by the storage device 50 may include information indicating that the message indicating the command requesting the value stored in the result register received at S809 is successfully received.

At S817, the host 400 may provide the PIU to the storage device 50. The command PIU provided at S817 may be a command for requesting provision of data from the storage device 50.

At S819, the storage device 50 may provide the data in PIU to the host 400.

At S821, the storage device 50 may provide the response PIU to the host 400. The response PIU received by the host 400 at S821 may include the replay protection block message including the value stored in the result register.

FIGS. 9A to 9C are diagrams illustrating an example of a replay protection block message provided during the replay protection block write operation of FIG. 8 based on some embodiments of the disclosed technology.

FIG. 9A is the replay protection block message provided by the host 400 to the storage device 50 in an authentication write request.

Referring to FIG. 9A, the replay protection block message of the authentication write request may be included in the command PIU provided by the host 400 to the storage device 50 at S801 as discussed above with reference to FIG. 8.

Specifically, the replay protection block message of the authentication write request may include the MAC calculated by the host 400, a current write counter value, the address where the data in the replay protection block is to be stored, a logical block count, a message indicating that the command PIU is the authentication write request.

FIG. 9B is the replay protection block message provided by the host 400 to the storage device 50 in a result read request.

Referring to FIG. 9B, the replay protection block message of the result read request may be included in the command PIU provided by the host 400 to the storage device 50 at S809 as discussed above with reference to FIG. 8.

The replay protection block message of the result read request may include only a message indicating that the command PIU is the result read request, and the remaining fields may be 0.

FIG. 9C is the replay protection block message provided by the storage device 50 to the host 400 in a result read response.

Referring to FIG. 9C, the replay protection block message of the result read response may be included in the response PIU provided by the storage device 50 to the host 400 at S821 as discussed above with reference to FIG. 8.

Referring to FIG. 9C, the replay protection block message of the result read response may include the MAC calculated by the storage device. The MAC calculated by the storage device may be an authentication code calculated by using the authentication key stored in the storage device and the metadata included in the replay protection block message of the result read response.

The replay protection block message of the result read response may include an updated write counter value having a value increased than the write counter value of the replay protection block message of FIG. 9A.

In an embodiment, the replay protection block message of the result read response may further include a message indicating that the command PIU is the result read response.

Figure 10:
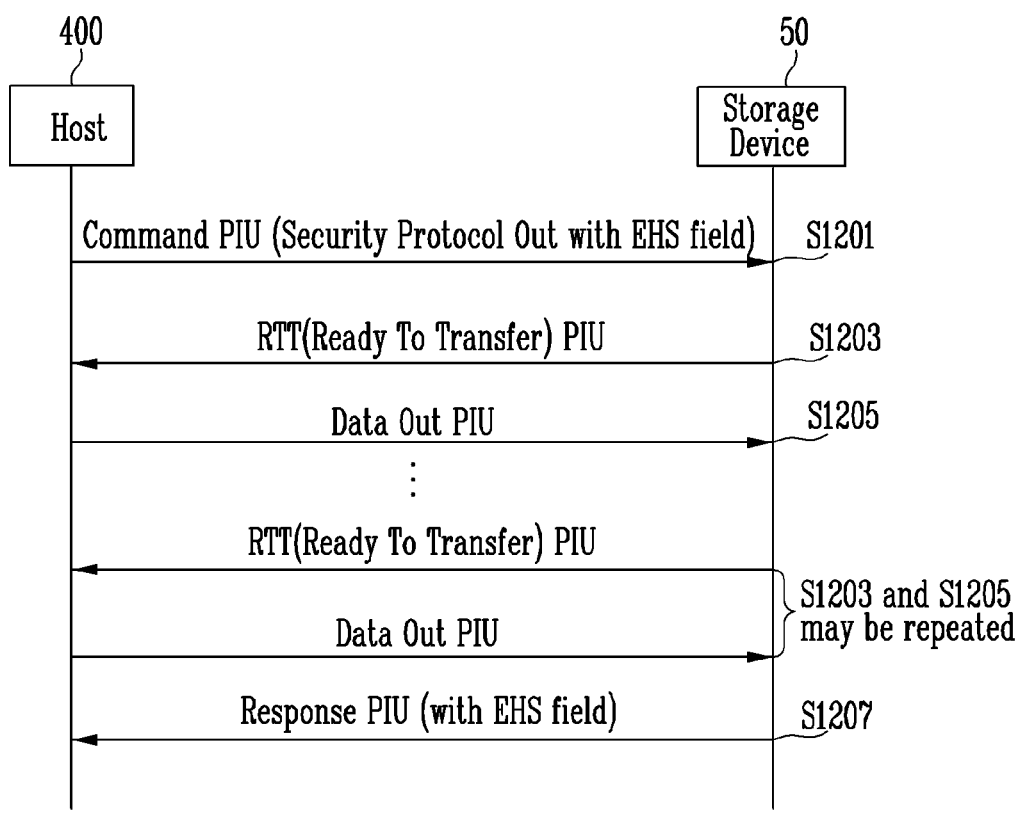
FIG. 10 is a flowchart illustrating a replay protection block write operation based on an embodiment of the disclosed technology.

FIG. 10 is a flowchart illustrating a replay protection block write operation based on an embodiment of the disclosed technology.

Referring to FIG. 10, at S1201, the host 400 may provide the command PIU to the storage device. The command PIU may include additional head segments. The additional head segment may include the replay protection block message. The replay block protection message may include a message indicating that the command PIU is a PIU instructing the replay protection block write operation. For example, the replay protection block message included in the command PIU may be the replay protection block message of the authentication write request as discussed above with reference to FIG. 9A.

At S1203, the storage device 50 may provide the "ready to transfer" PIU to the host 400. The ready to transfer PIU may include a PIU that is provided when the storage device 50 is ready to receive the data to be provided by the host 400. In an embodiment, the ready to transfer PIU may be a PIU that provides a message indicating that it is ready to receive the data out PIU. In an embodiment, when a buffer space for storing data to be received from the host 400 is secured, the storage device 50 may provide the ready to transfer PIU to the host 400.

At S1205, the host 400 may provide the data out PIU to the storage device 50. The data out PIU may include the data to be stored in the replay protection block.

In an embodiment, the operations S1203 and S1205 may be repeated several times depending on an amount of data to be stored in the replay protection block by the host 400.

At S1207, the storage device 50 may provide the response PIU to the host 400. The response PIU provided by the storage device 50 may include the replay protection block message. For example, the replay protection block message included in the response PIU may be the replay protection block message of the result read response as discussed above with reference to FIG. 9C. In an embodiment, the response PIU may include the additional head segments, and the replay protection block message may be included in the additional head segment.

Figure 11:
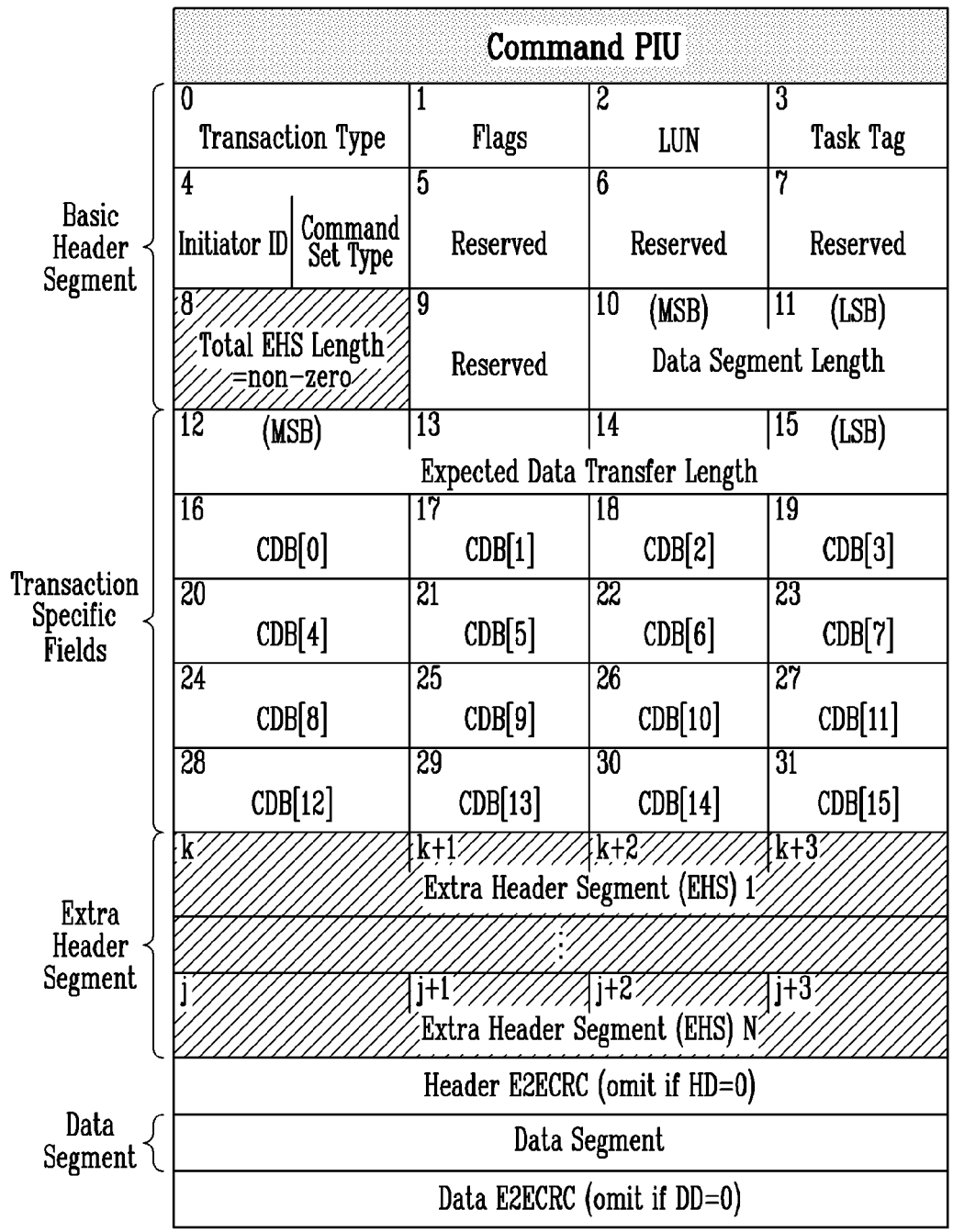
FIG. 11 is a diagram illustrating an example of a command PIU of FIG. 10 based on some embodiments of the disclosed technology.

FIG. 11 is an example of a diagram illustrating an embodiment of the command PIU of FIG. 10 based on some embodiments of the disclosed technology.

Referring to FIG. 11, the command PIU may include a basic header segment, a transaction specific field, an additional header segment, and a data segment. Based on an embodiment of the disclosed technology, since the command PIU of FIG. 10 includes the additional header segment, the total additional header segment length (Total EHS Length) corresponding to byte address 8 among fields included in the basic header segment may have a value other than 0 (non-zero). The command PIU of FIG. 10 may include data corresponding to the size of the replay protection block message provided by the host 400 in the additional header segment. Therefore, a value of the total additional header segment length (Total EHS Length) of the command PIU of FIG. 10 may be a value obtained by dividing the total number of bytes of the replay protection block message by 4.

FIG. 12 is a diagram illustrating an example of the response PIU of FIG. 10 an example of.

Referring to FIG. 12, the response PIU may include a basic header segment, a transaction specific field, an additional header segment, and a data segment. Based on an embodiment of the disclosed technology, since the response PIU of FIG. 10 includes the additional header segment, the total additional header segment length (Total EHS Length) corresponding to byte address 8 among fields included in the basic header segment may have a value other than 0 (non-zero). The response PIU of FIG. 10 may include data corresponding to the size of the replay protection block message provided by the storage device 50 to the host 400 in the additional header segment. Therefore, a value of the total additional header segment length (Total EHS Length) of the response PIU of FIG. 10 may be a value obtained by dividing the total number of bytes of the replay protection block message by 4.

Figure 13:
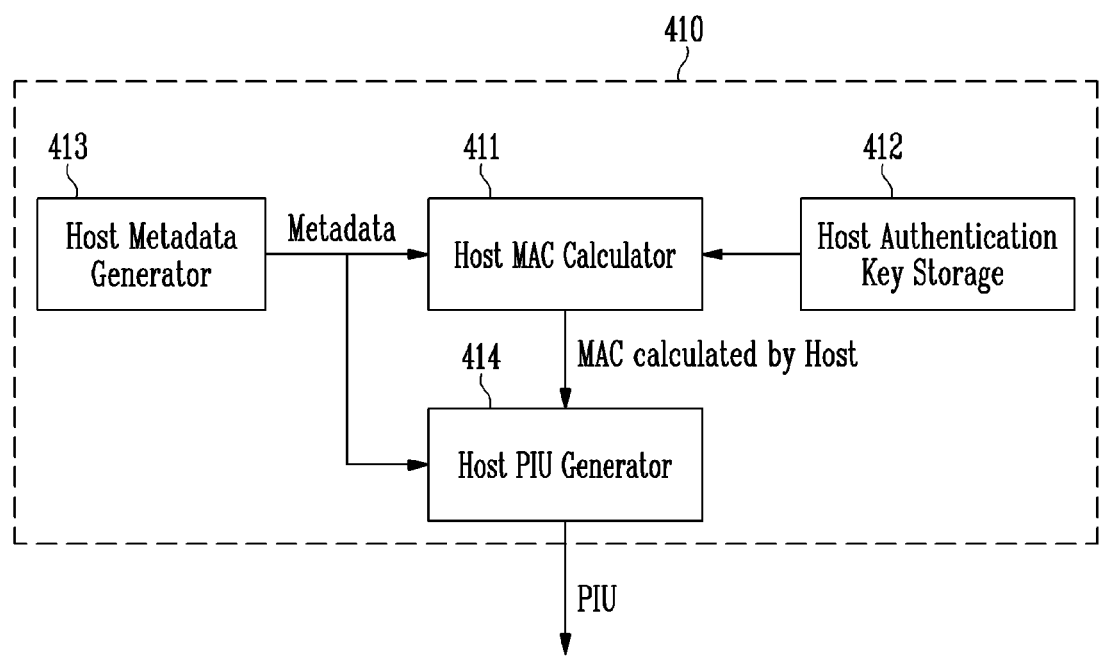
FIG. 13 is a diagram illustrating an operation of a replay protection block host controller of FIG. 4.

FIG. 13 is a diagram illustrating an operation of the replay protection block host controller of FIG. 4.

Referring to FIG. 13, the replay protection block host controller 410 may include a host message authentication code calculator 411, a host authentication key storage 412, a host metadata generator 413, and a host protocol unit generator 414.

The host authentication key storage 412 may store the authentication key. The authentication key stored by the host authentication key storage 412 may be the same authentication key as the authentication key stored by the storage device 50. The authentication key may be stored in advance before performing a write or read operation on the replay protection block.

When the replay protection block write operation is performed, the host metadata generator 413 may generate the metadata. The metadata may include information of the current write counter value, the address where data is to be stored, the block count of data to be stored, and the message requesting the replay protection block write operation.

The host metadata generator 413 may provide the generated metadata to the host message authentication code calculator 411 and the host protocol unit generator 414.

The host message authentication code calculator 411 may generate the MAC using the metadata and the authentication key. Specifically, the host message authentication code calculator 411 may generate the MAC using the hash-based MAC (H MAC SHA-256). The generated MAC may be used for the storage device 50 to perform the authentication operation. The MAC may have a length of 256 bits (32 bytes). The authentication key used to generate the MAC may be 256 bits. The host message authentication code calculator 411 may provide the generated MAC to the host protocol unit generator 414.

The host protocol unit generator 414 may generate the PIU to be provided to the storage device 50. Specifically, the host protocol unit generator 414 may generate the replay protection block message including the authentication data and the metadata. The authentication data may include the MAC generated by the host message authentication code calculator 411. The host protocol unit generator 414 may generate the command PIU including the replay protection block message in the additional header segment and provide the generated command PIU to the storage device 50. The command PIU may include the additional header segment, and the total additional header segment length field in the basic header segment may include a value other than 0.

The host protocol unit generator 414 may generate the data out PIU. The data out PIU may include the data segments. The host protocol unit generator 414 generates the data out PIU in which the write data to be stored in the replay protection block is included in the data segment, and provide the generated data out PIU to the storage device 50.

Figure 14:
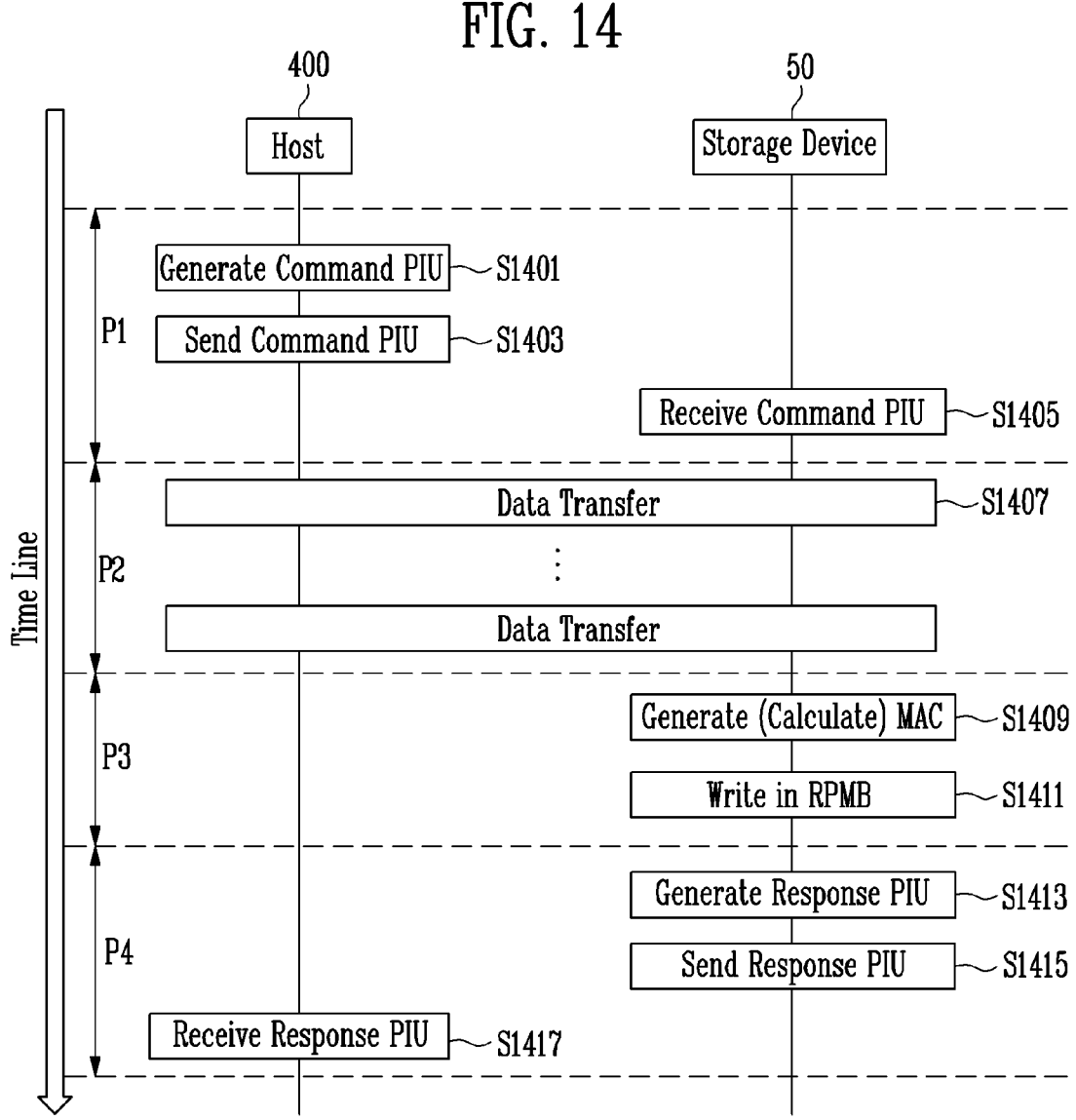
FIG. 14 is a diagram illustrating an example of an operation of calculating a message authentication code (MAC) by a data storage device.

FIG. 14 is a diagram illustrating an example of an operation of calculating an MAC by a data storage device.

Referring to FIG. 14, a first period P1 may be a period in which the host 400 provides an authentication write request to the storage device 50. Specifically, at S1401, the host 400 may generate the command PIU. The generated command PIU may include the additional head segments. The additional head segment may include the replay protection block message. The replay block protection message may include a message indicating that the command PIU is a protocol unit instructing the replay protection block write operation. For example, the replay protection block message included in the command PIU may be the replay protection block message of the authentication write request as discussed above with reference to FIG. 9A. At S1403, the host 400 may provide the generated command PIU to the storage device 50. At S1405, the storage device 50 may receive the command PIU provided by the host.

A second period P2 may be a data transfer period in which the host 400 transfers data to be stored in the replay protection block to the storage device 50.

Data transfer expressed by step S1407 may include each of steps S1203 and S1205 as discussed above with reference to FIG. 10. Specifically, the storage device 50 may provide the ready to transfer PIU to the host 400, and the host 400 may respond to the ready to transfer PIU of the storage device 50. The ready to transfer PIU may be a protocol unit provided when the storage device 50 is ready to receive the data to be provided by the host 400. In an embodiment, the ready to transfer PIU may be a protocol unit that provides a message indicating that it is ready to receive the data out PIU. In an embodiment, when a buffer space for storing the data to be received from the host 400 is secured, the storage device 50 may provide the ready to transfer PIU to the host 400. The host 400 may provide the data out PIU to the storage device 50 in response to the ready to transfer PIU provided by the storage device 50. The data out PIU may include data to be stored in the replay protection block. The data transfer may be repeated, and the number of repetitions is determined based on the amount of data to be stored in the replay protection block by the host 400. When the plurality of data transfers are performed, a process of providing the ready to transfer PIU and the data out PIU between the host 400 and the storage device 50 may be repeated.

A third period P3 may be a period in which the data is stored in the replay protection block.

In this period, the storage device 50 may calculate the MAC using the metadata included in the replay protection block message included in the received data out PIU (S1409), and may store the data in the replay protection block based on whether the calculated MAC is the same as the MAC of the replay protection block message of the authentication write request included in the command PIU provided at S1403 by the host 400 (S1411).

A fourth period P4 may be a period in which the storage device 50 provides a result of the replay protection block write operation to the host 400.

Specifically, at S1413, the storage device 50 may generate the response PIU described through step S1207 of FIG. 10. The response PIU may include the replay protection block message. For example, the replay protection block message included in the response PIU may be the replay protection block message of the result read response as discussed above with reference to FIG. 9C. In an embodiment, the response PIU may include the additional head segments, and the replay protection block message may be included in the additional head segment. At S1415, the storage device 50 may provide the generated response PIU to the host 400, and at S1417, the host 400 may receive the response PIU provided by the storage device 50.

In the replay protection block write operation as discussed above with reference to FIG. 8, since the replay protection block write operation includes the authentication write request, the result read request, and the result read response, an overhead in which an execution time of the replay protection block write operation is increased due to a time when the storage device 50 calculates the MAC may not occur.

However, in some embodiments of the disclosed technology (e.g., FIG. 10), when the replay protection block write operation is performed by providing one command PIU and one response PIU through steps S1201 to S1207, since the storage device 50 calculates the MAC after receiving all data, an overhead in which an execution time of the entire replay protection block write operation is increased may occur.

Figure 15:
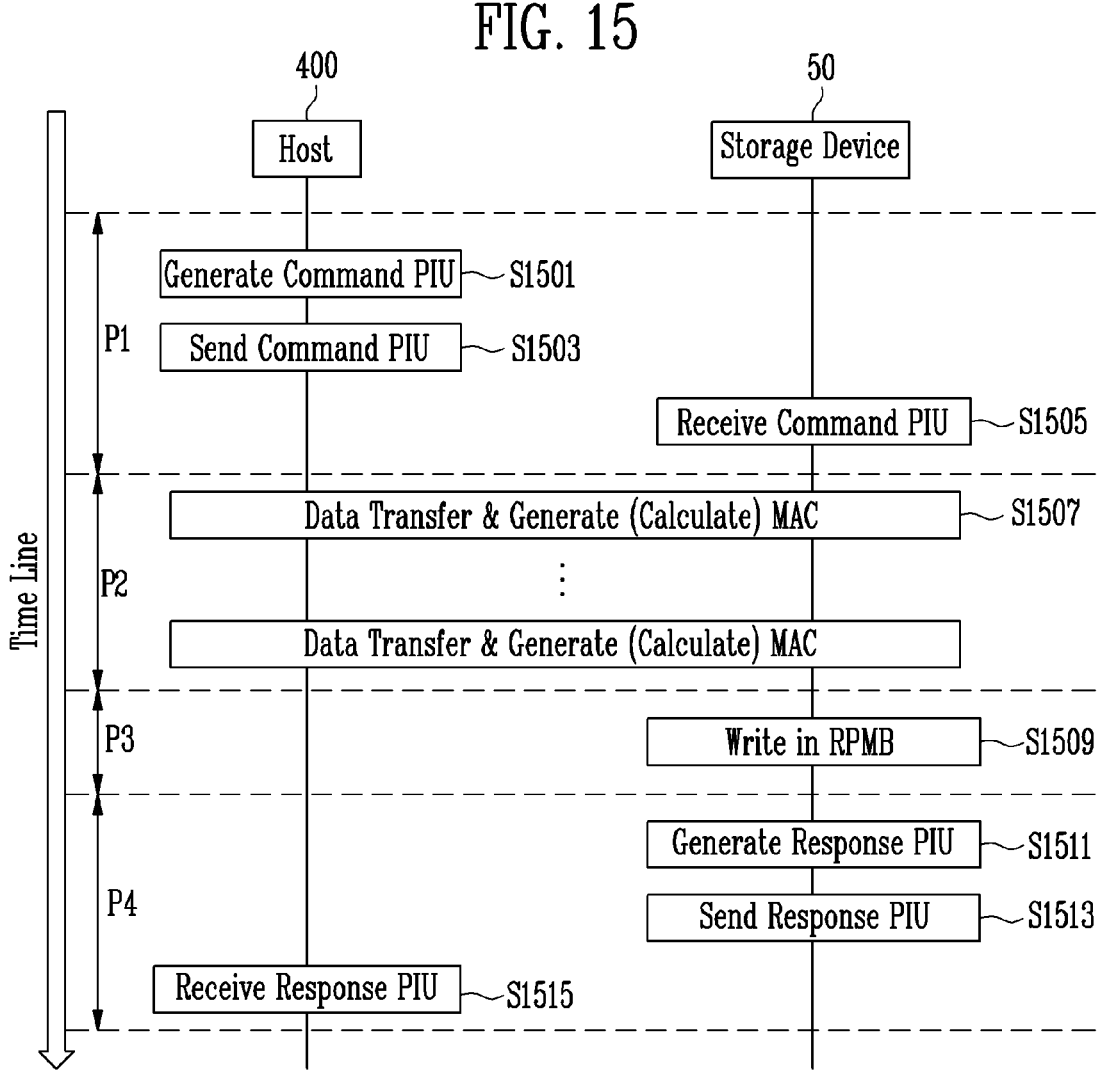
FIG. 15 is a diagram illustrating another embodiment of an operation of calculating an MAC by a data storage device.

FIG. 15 is a diagram illustrating another embodiment of an operation of calculating an MAC by a data storage device.

Referring to FIG. 15, steps S1501 to S1505 included in the first period P1 are the same as steps S1401 to S1405 of FIG. 14. In addition, steps S1511 to S1515 included in the fourth period P4 are the same as steps S1413 to S1417 of FIG. 14, respectively.

A difference between the embodiment of FIG. 15 and the embodiment of FIG. 14 is that the storage device 50 calculates the MAC in the second period P2 that is the data transfer period in which the host 400 transfers the data to be stored in the replay protection block to the storage device 50.

Specifically, the replay protection block message of the authentication write request included in the command PIU received by the storage device 50 at S1505 may include the MAC calculated by the host 400, the current write counter value, the address where the data in the replay protection block is to be stored, the block count indicating the number of logical blocks to be stored in the replay protection block, and the message indicating that the command PIU is the authentication write request. Therefore, the storage device 50 may recognize the MAC already calculated by the host 400 and a size of data to be stored in the replay protection block by the host 400 before receiving data in the second period P2. The storage device 50 may receive a plurality of data out PIUs based on the size of data that the host 400 intends to store in the replay protection block. The host 400 may provide the data out PIU to the storage device 50 in response to the ready to transfer PIU provided by the storage device 50. In an embodiment, the ready to transfer PIU may include information on a size of data that may be received by the storage device 50. The host 400 may provide data as much as the size of the data included in the ready to transfer PIU provided by the storage device 50 to the storage device 50 through the data out PIU.

When the storage device 50 receives the data out PIU, the storage device 50 may calculate the MAC using the metadata included in the replay protection block message included in the data out PIU and the authentication key 111 stored in the replay protection block 110a as discussed above with reference to FIG. 4.

The MAC calculated using the metadata included in the replay protection block message included in a previous data out PIU may be used to calculate the MAC together with the metadata included in the replay protection block message included in a subsequent data out PIU.

When the storage device 50 receives the data out PIU, the storage device 50 may calculate the MAC using the metadata included in the replay protection block message included in the data out PIU, and provide the ready to transfer PIU to the host 400 in order to request a next data out PIU.

After receiving all data, since the storage device 50 calculates the MAC in the second period P2, the data may be stored in the replay protection block based on whether the calculated MAC is the same as the MAC calculated by the host 400, which is included in replay protection block message of the authentication write request included in the command PIU received at S1505 (S1509).

In some embodiments of the disclosed technology (e.g., FIG. 15), since the storage device 50 calculates the MAC while receiving data (in parallel with data reception), an overhead may be prevented from occurring as much as a time for calculating the MAC.

Figure 16:
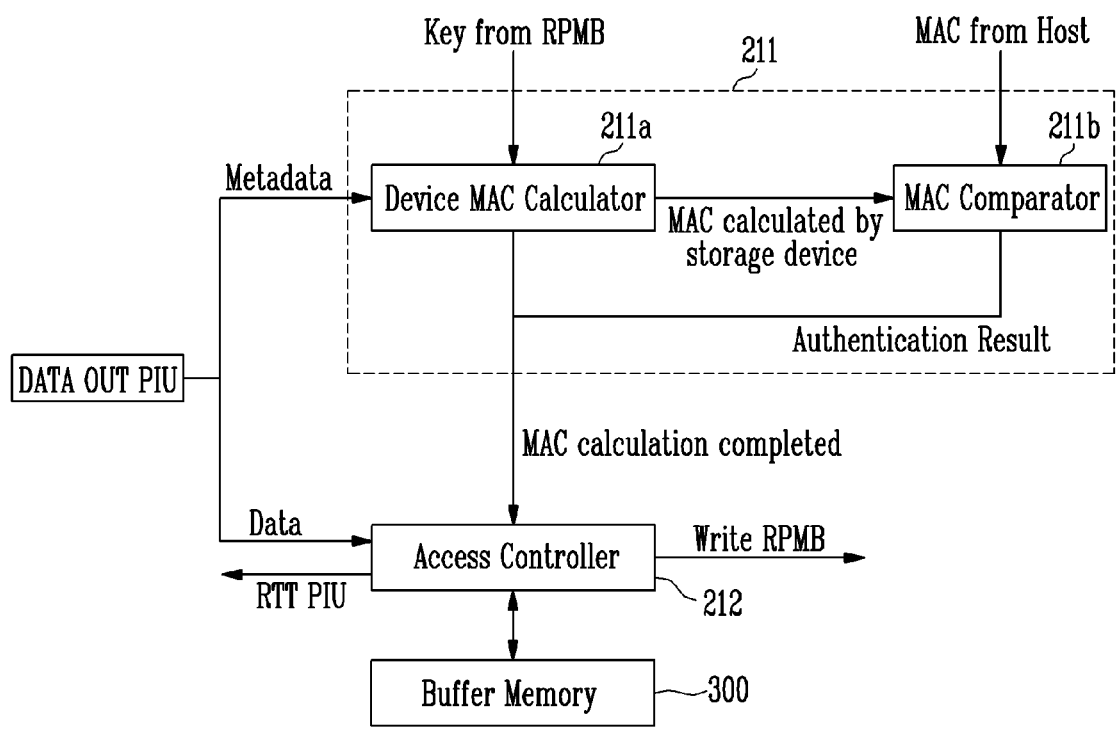
FIG. 16 is a block diagram illustrating an example of a structure of a data storage device based on an embodiment of the disclosed technology.

FIG. 16 is a block diagram illustrating an example of a structure of a data storage device based on an embodiment of the disclosed technology.

Referring to FIG. 16, the replay protection block device controller 210 may further include an authentication manager 211 and an access controller 212.

The authentication manager 211 may perform an authentication operation using the authentication data and the metadata included in the replay protection block message and the authentication key 111 stored in the replay protection block 110a. The authentication manager 211 may provide a result of performing the authentication operation to the access controller 212. The access controller 212 may store data in the replay protection block 110a or prohibit storage of data in the replay protection block 110a based on the result of performing the authentication operation.

When the authentication operation is successful, the access controller 212 may control the replay protection block 110a to store write data to be stored in the replay protection block, in the replay protection block data area 114. The access controller 212 may increase the value of the write counter 112 and store information indicating that the replay protection block write operation is completed in the result register 113.

When the authentication operation is failed, the access controller 212 may not store the write data requested to be stored in the replay protection block, in the replay protection block data area 114. The access controller 212 may maintain the value of the write counter 112 and store information indicating that the replay protection block write operation is completed in the result register 113.

The authentication manager 211 may include a device message authentication code calculator 211a and a message authentication code comparator 211b.

During the replay protection block write operation, the device message authentication code calculator 211a may obtain the metadata from the command PIU received from the replay protection block host controller 410. The device message authentication code calculator 211a may obtain the authentication key stored in the replay protection block. The device message authentication code calculator 211a may calculate the MAC using the hash-based MAC (HMAC SHA-256). The device message authentication code calculator 211a may provide the MAC calculated using the metadata of the replay protection block message received from the replay protection block host controller 410 and the authentication key stored in the replay protection block of the memory device to the authentication code comparator 211b.

In an embodiment, the access controller 212 may obtain the metadata from the command PIU received from the replay protection block host controller 410. The metadata may include information indicating a size of write data to be stored based on the replay protection block write operation. Specifically, the metadata may include a block count indicating the number of logical blocks of the write data.

Through this, the access controller 212 may recognize the size of the data to be stored through the replay protection block write operation. The access controller 212 may provide the host 400 with the ready to transfer PIU requesting data to be received through the replay protection block write operation based on a remaining capacity of the buffer memory 300. In an embodiment, the ready to transfer PIU may include the device replay protection block message. The device replay protection block message included in the ready to transfer PIU may include information on the size of the write data that may be received by the access controller 212.

The host 400 may divide the write data into a plurality of write data chunks based on the ready to transfer PIU provided by the access controller 212 and provide the plurality of write data chunks to the memory controller 200.

The data out PIU may include a write data chunk and a data out replay protection block message indicating that the write data chunk is data to be stored in the replay protection block. The data out replay protection block message may include data out metadata used to calculate the device message authentication code. In an embodiment, the data out metadata may include a block count of a corresponding write data chunk.

Based on an embodiment of the disclosed technology, when the host 400 provides the write data chunk to the memory controller 200 using the data out PIU in response to the ready to transfer PIU, the device message authentication code calculator 211a may update (accumulatively calculate) the data out metadata and the previously calculated MAC included in the data output PIU using the hash-based MAC (HMAC SHA-256).

The device message authentication code calculator 211a may update the MAC using the data out metadata included in each data output PIU while receiving all data out PIUs.

The message authentication code comparator 211b may obtain the MAC from the command PIU received from the replay protection block host controller 410. Specifically, the message authentication code comparator 211b may obtain the MAC generated by the replay protection block host controller 410 from the replay protection block message included in the command PIU received from the replay protection block host controller 410. The message authentication code comparator 211b may compare whether the MAC generated by the replay protection block host controller 410 and the MAC calculated by the device message authentication code calculator 211a are the same. The message authentication code comparator 211b may provide a comparison result to the access controller 212.

When the MAC generated by the replay protection block host controller 410 and the MAC calculated by the device message authentication code calculator 211a are the same, the access controller 212 may control the memory device to store the data in the replay protection block. The access controller 212 may increase the write counter value and store information indicating that the replay protection block write operation is successful in the result register.

When the MAC generated by the replay protection block host controller 410 and the MAC calculated by the device message authentication code calculator 211a are not the same, the access controller 212 may not store data in the replay protection block. In this case, the access controller 212 may not increase the write counter value and store information indicating that authentication is failed in the result register.

The access controller 212 may generate the replay protection block message and generate the PIU including the generated message. Specifically, the access controller 212 may generate the response PIU. The response PIU generated by the access controller 212 may include the additional header segment. The access controller 212 may include the replay protection block message in the additional header segment of the response PIU and provide the replay protection block message to the host 400.

The response PIU provided by the access controller 212 to the host 400 may include the MAC calculated by the device message authentication code calculator 211a. The response PIU provided by the access controller 212 to the host 400 may further include the write count value, the result code, and a message indicating the response as a result of the replay protection block write operation. Here, the write count value may include an increased write count value when the replay protection block write operation is successful. In addition, the result code may be a result code indicating that the replay protection block write operation is successful. Conversely, when the replay protection block write operation is failed, the write count value may include an existing write count value. In addition, the result code may be a result code indicating a reason why the replay protection block write operation is failed.

Figure 17:
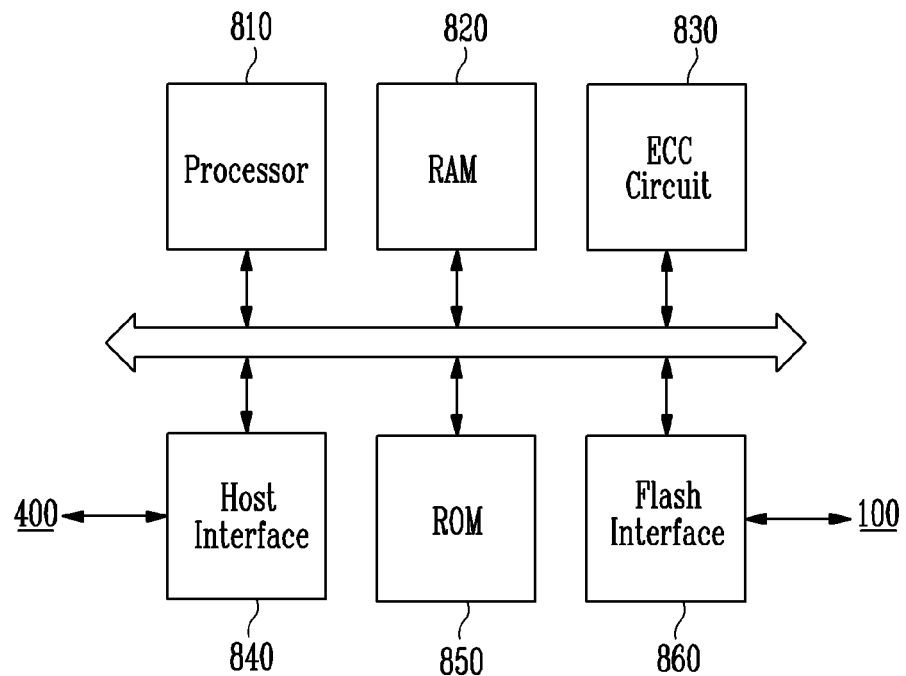
FIG. 17 is a diagram illustrating another example of a memory controller of FIG. 1 based on some embodiments of the disclosed technology.

FIG. 17 is a diagram illustrating another example of the memory controller of FIG. 1 an example of.

Referring to FIG. 17, the memory controller 800 may include a processor 810, a RAM 820, an error correction code (ECC) circuit 830, a host interface 840, a ROM 850, and a flash interface 860.

The processor 810 may control an overall operation of the memory controller 800. The RAM 820 may be used as a buffer memory, a cache memory, an operation memory, and the like of the memory controller 800.

The ROM 850 may store various information required for the memory controller 800 to operate in a firmware form.

The memory controller 800 may communicate with an external device (for example, the host 400, an application processor, and the like) through the host interface 840.

The memory controller 800 may communicate with the memory device 100 through the flash interface 860. The memory controller 800 may transmit a command CMD, an address ADDR, a control signal CTRL, and the like to the memory device 100 and receive data DATA through the flash interface 860. For example, the flash interface 860 may include a NAND interface.

Figure 18:
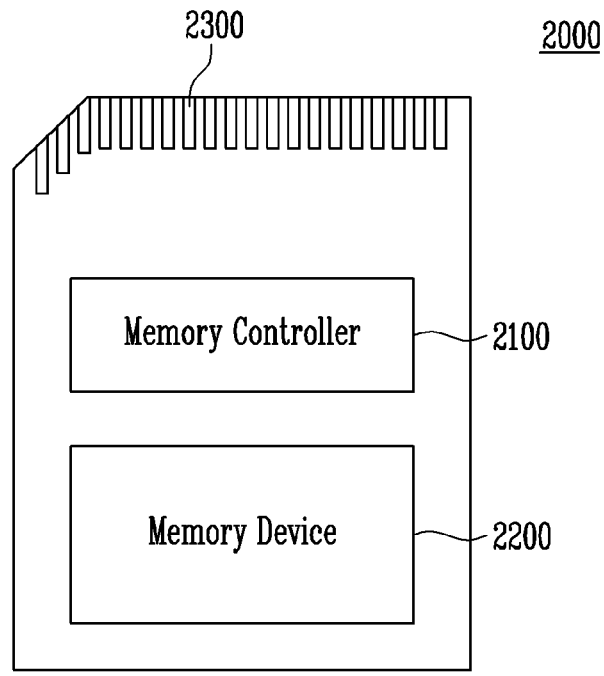
FIG. 18 is a block diagram illustrating a memory card system that includes a data storage device based on an embodiment of the disclosed technology.

FIG. 18 is a block diagram illustrating a memory card system that includes a data storage device based on an embodiment of the disclosed technology.

Referring to FIG. 18, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to perform firmware operations for controlling the memory device 2200.

The configuration of the memory controller 2100 may be identical or similar to the memory controller 200 illustrated in FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) based on a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may include nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

The memory controller 2100 and the memory device 2200 may be integrated into one semiconductor device such as a memory card. For example, the memory controller 2100 and the memory device 2200 may be integrated into a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 19:
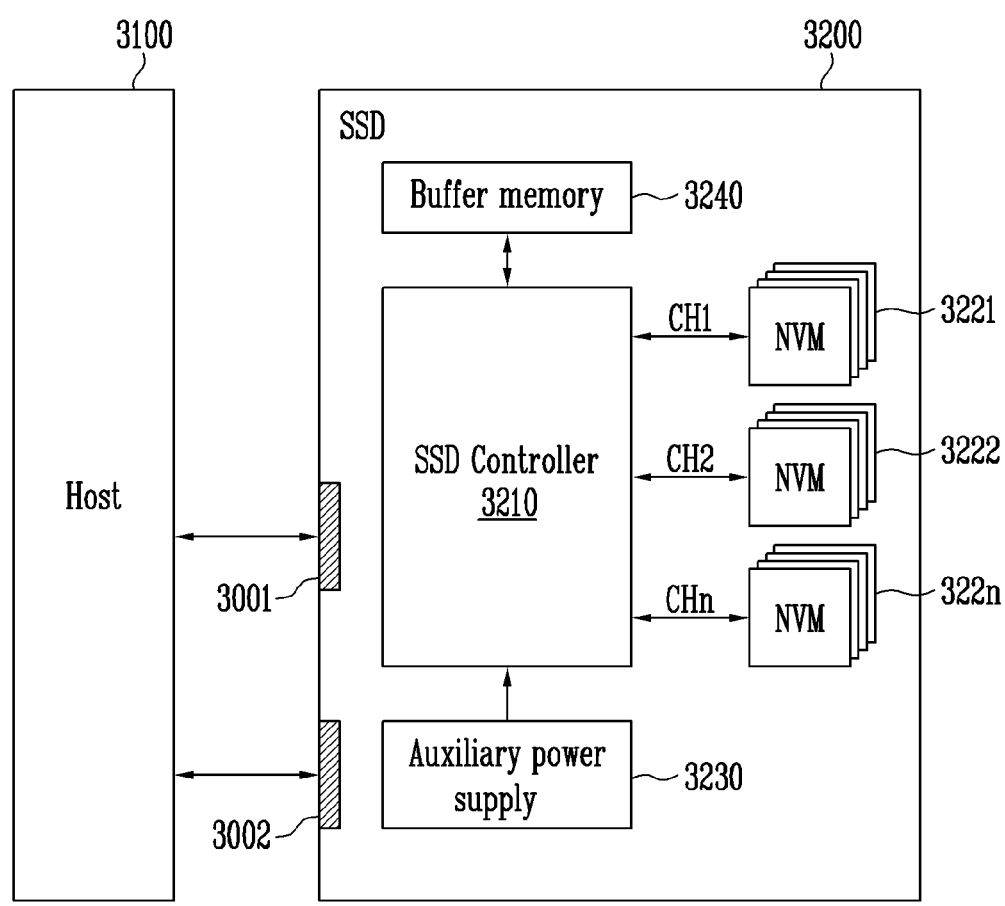
FIG. 19 is a block diagram illustrating a solid state drive (SSD) system that includes a data storage device based on an embodiment of the disclosed technology.

FIG. 19 is a block diagram illustrating a solid-state drive (SSD) system that includes a data storage device based on an embodiment of the disclosed technology.

Referring to FIG. 19, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of nonvolatile memories 3221 to 322n, an auxiliary power supply 3230, and a buffer memory 3240.

Based on an embodiment of the disclosed technology, the SSD controller 3210 may perform the function of the memory controller 200 described with reference to FIG. 1.

The SSD controller 3210 may control the plurality of nonvolatile memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of nonvolatile memories 3221 to 322n, or may temporarily store metadata (for example, a mapping table) of the nonvolatile memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 20:
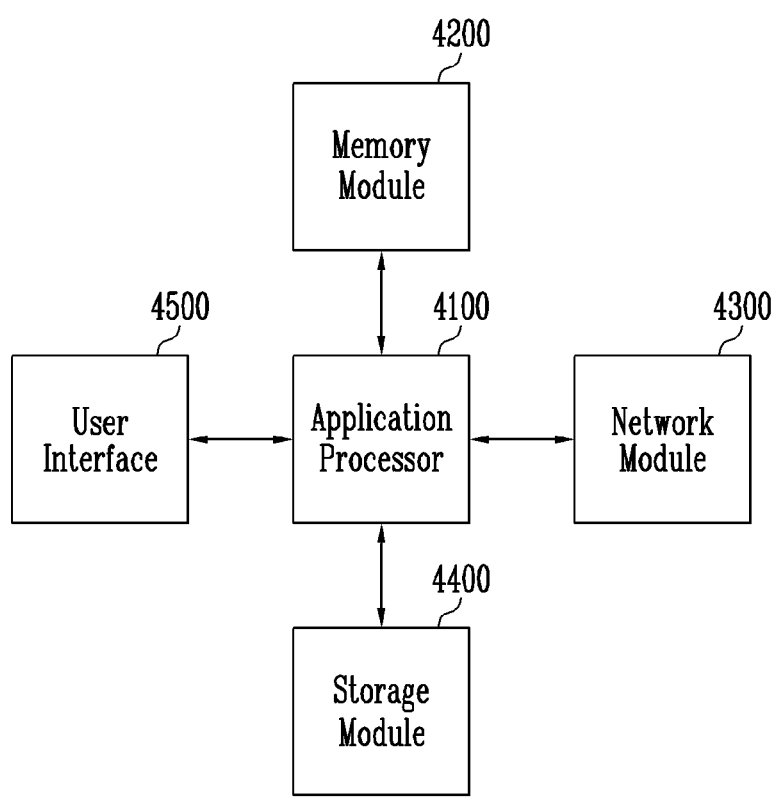
FIG. 20 is a block diagram illustrating a user system that includes a data storage device based on an embodiment of the disclosed technology.

FIG. 20 is a block diagram illustrating a user system that includes the data storage device based on an embodiment of the disclosed technology.

Referring to FIG. 20, the user system 4000 includes an application processor 4100, a memory module 4200, a network module 4300, a storage module 4400, and a user interface 4500.

The application processor 4100 may perform operations associated with hardware components, an operating system (OS), and/or a user program included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A data storage device comprising: a memory device including a protected memory block; and a memory controller coupled to the memory device to control operations thereof and configured to: receive, from a host, a command protocol unit including a host side protection message requesting to store data in the protected memory block; sequentially receive, from the host, a plurality of data units including the data; and accumulatively calculate a device message authentication code, based on a first metadata included in one data unit among the plurality of data units and a previously calculated device message authentication code determined based on a previously received data unit received before the one data unit, while receiving a next data unit following the one data unit.

2. The data storage device of claim 1, further comprising:
a buffer memory configured to temporarily store the data to be written in the protected memory block.

3. The data storage device of claim 2, wherein the memory controller comprises: an authentication manager configured to perform an authentication operation and output a result of the authentication operation; and an access controller configured to control the protected memory block based on the result of the authentication operation, and wherein the host side protection message comprises: authentication data including a host message authentication code generated by the host; and metadata including second data other than the authentication data.

4. The data storage device of claim 3, wherein the protected memory block includes a replay protection block, comprising:
an authentication key storage configured to store an authentication key that is used to authenticate the replay protection block;
a write counter configured to store a write count value corresponding to a number of successful write operations in the replay protection block;
a result register configured to store a result of performing an operation on the replay protection block; and
a replay protection block data area configured to store data.

5. The data storage device of claim 4, wherein the authentication manager comprises:
a device message authentication code calculator configured to generate the device message authentication code; and a message authentication code comparator configured to generate the result of the authentication operation based on whether the host message authentication code and the device message authentication code are the same.

6. The data storage device of claim 5, wherein the data to be written in the protected memory block includes a plurality of data chunks to be written to the memory device, and
wherein the plurality of data units includes the plurality of data chunks, respectively.

7. The data storage device of claim 6, wherein the access controller is configured to notify the host that there is a memory space for storing at least one of the plurality of data units in the buffer memory.

8. The data storage device of claim 6, wherein each of the plurality of data units comprises:
one of the plurality of data chunks; and
a data-out replay protection block message indicating that the one of the plurality of data chunks corresponds to data to be stored in the replay protection block,
wherein the data-out replay protection block message includes metadata that is used to determine the device message authentication code.

9. The data storage device of claim 8, wherein the message authentication code comparator generates the result of the authentication operation based on whether the host message authentication code matches the device message authentication code upon completion of receipt of the plurality of data units.

10. The data storage device of claim 9, wherein the access controller controls the memory device to store the data in the replay protection block in response to the result of the authentication operation indicating that the host message authentication code matches the device message authentication code.

11. The data storage device of claim 10, wherein the access controller is configured to control the memory device to increase a current write count value stored in the write counter, store the increased write count value in the write counter, and store, in the result register, a result code indicating a completion of a write operation on the replay protection block.

12. The data storage device of claim 11, wherein the access controller generates a device replay protection block message including the device message authentication code, the increased write count value, an address of the data stored, the result code, and information indicating a response corresponding to the command protocol unit.

13. The data storage device of claim 12, wherein the access controller generates a response protocol unit including the device replay protection block message, and provides the response protocol unit to the host, and
wherein the device replay protection block message is included in an additional header segment of the response protocol unit.

14. The data storage device of claim 9, wherein the access controller controls the memory device to store a result code indicating that a write operation on the replay protection block is failed in the result register, in response to the result of the authentication operation indicating that the host message authentication code and the device message authentication code are not the same.

15. The data storage device of claim 14, wherein the access controller generates a device replay protection block message including the device message authentication code, a current write count value stored in the write counter, an address where storage of the data is failed, the result code, and information indicating a response corresponding to the command protocol unit.

16. The data storage device of claim 15, wherein the access controller generates a response protocol unit including the device replay protection block message, and provides the response protocol unit to the host, and
wherein the device replay protection block message is included in an additional header segment of the response protocol unit.

17. The data storage device of claim 1, wherein the command protocol unit comprises:
a basic header segment included in common in protocol units transmitted between the host and the memory controller;
a transaction specific field including a unique value corresponding to a type of the protocol units; and
an additional header segment that is a header segment other than the basic header segment, and
wherein the host side protection message is included in the additional header segment.

18. The data storage device of claim 17, wherein the basic header segment includes a total additional header segment length indicating a length of the additional header segment.

* * * * *